(12) United States Patent
Roach

(10) Patent No.: US 6,403,263 B1
(45) Date of Patent: Jun. 11, 2002

(54) CATHODE CURRENT COLLECTOR FOR ELECTROCHEMICAL CELLS

(75) Inventor: Joseph M. Roach, South Hadley, MA (US)

(73) Assignee: Moltech Corporation, Tucson, AZ (US)

( * ) Notice: Subject to any disclaimer, the term of this patent is extended or adjusted under 35 U.S.C. 154(b) by 24 days.

(21) Appl. No.: 09/668,706

(22) Filed: Sep. 20, 2000

(51) Int. Cl.⁷ .................................................. H01M 4/64
(52) U.S. Cl. ........................ 429/233; 429/245; 429/212; 429/231.95; 29/623.5; 204/279
(58) Field of Search .................................. 429/233, 236, 429/237, 245, 234, 231.95, 218.1, 212; 29/623.1, 623.5, 623.4, 2; 204/279; 252/62.2; 205/58; 141/1.1, 32, 33

(56) References Cited

U.S. PATENT DOCUMENTS

| | | |
|---|---|---|
| 4,664,991 A | 5/1987 | Perichaud et al. |
| 4,739,018 A | 4/1988 | Armand et al. |
| 4,833,048 A | 5/1989 | De Jonghe et al. |
| 4,917,974 A | 4/1990 | De Jonghe et al. |
| 5,162,175 A | 11/1992 | Visco et al. |
| 5,194,341 A | 3/1993 | Bagley et al. |
| 5,324,599 A | 6/1994 | Oyama et al. |
| 5,399,447 A | 3/1995 | Chaloner-Gill et al. |
| 5,441,830 A | 8/1995 | Moulton et al. |
| 5,464,707 A | 11/1995 | Moulton et al. |
| 5,478,676 A * | 12/1995 | Turi et al. ................... 429/234 |
| 5,516,598 A | 5/1996 | Visco et al. |
| 5,518,839 A | 5/1996 | Olsen |
| 5,520,850 A | 5/1996 | Chaloner-Gill et al. |
| 5,529,860 A | 6/1996 | Skotheim et al. |
| 5,538,812 A | 7/1996 | Lee et al. |
| 5,578,396 A | 11/1996 | Fauteux et al. |
| 5,588,971 A | 12/1996 | Fauteux et al. |
| 5,591,544 A | 1/1997 | Fauteux et al. |
| 5,601,947 A | 2/1997 | Skotheim et al. |
| 5,690,702 A | 11/1997 | Skotheim et al. |
| 5,723,230 A | 3/1998 | Naoi et al. |
| 5,783,330 A | 7/1998 | Naoi et al. |
| 5,792,575 A | 8/1998 | Naoi et al. |
| 5,827,615 A | 10/1998 | Touhsaent et al. |
| 5,882,819 A | 3/1999 | Naoi et al. |
| 5,935,724 A | 8/1999 | Spillman et al. |
| 5,935,728 A | 8/1999 | Spillman et al. |
| 5,973,913 A * | 10/1999 | McEwen et al. ............. 361/523 |
| 6,048,637 A * | 4/2000 | Tsukahara et al. ............ 429/53 |
| 6,069,221 A | 5/2000 | Chassar et al. |
| 6,117,590 A | 9/2000 | Skotheim et al. |
| 6,153,337 A | 11/2000 | Carlson et al. |
| 6,201,100 B1 | 3/2001 | Gorkovenko et al. |
| 6,302,928 B1 * | 10/2001 | Xu et al. ................... 29/623.1 |

FOREIGN PATENT DOCUMENTS

| | | |
|---|---|---|
| WO | WO99/33125 | 7/1999 |
| WO | WO00/36674 | 6/2000 |
| WO | WO00/36678 | 6/2000 |

OTHER PUBLICATIONS

Alamgir et al., "Room Temperature Polymer Electrolytes", *Lithium Batteries, New Materials, Developments and Perspectives*, Chapter 3, pp. 93–136, Elsevier, Amsterdam (1994). No month available.

Dominey. "Current State of the Art on Lithium Battery Electrolytes", *Lithium Batteries, New Materials, Developments and Perspectives*, Chapter 4, pp. 137–165, Elsevier, Amsterdam (1994). No month available.

* cited by examiner

*Primary Examiner*—Gabrielle Brouillette
*Assistant Examiner*—R Alejandro
(74) *Attorney, Agent, or Firm*—Jacqueline M. Nicol; Steven A. Carlson

(57) ABSTRACT

Provided are cathode current collectors for use in electrochemical cells, wherein the current collector comprises a conductive primer layer applied upon a conductive support, and the primer layer comprises from about 25 to 70% by weight of a crosslinked polymeric material formed from a reaction of a polyvinyl acetal and a crosslinking agent, and about 30 to 75% by weight of a conductive filler. The present invention also pertains to methods of forming such cathode current collectors for use in electrochemical cells comprising (i) an anode comprising lithium, and (ii) a cathode comprising an electroactive sulfur-containing material.

20 Claims, 3 Drawing Sheets

CATHODE CURRENT COLLECTOR FOR ELECTROCHEMICAL CELLS

TECHNICAL FIELD

The present invention relates generally to the field of electrochemical cells. More particularly, this invention pertains to lithium batteries in which the cathode comprises an electroactive sulfur-containing material and the cathode current collector comprises a conductive support and a crosslinked polymeric conductive primer layer.

BACKGROUND

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which this invention pertains.

As consumer demand for, and reliance upon, portable and hand-held electronic devices such as mobile telephones, portable computers, pagers and palm pilots has grown, so has the need for portable power supplies, such as rechargeable batteries, with long cycle life, rapid recharge capacity, and high energy density become more important. There has been considerable interest in recent years in developing high energy density primary and secondary batteries with alkali-metal anode materials, and, in particular, anodes based on lithium.

One component of a battery, especially a rechargeable battery, which is important for long cycle life, rapid charge capacity, and high energy density, is the current collector. In rechargeable lithium batteries, for example, current collectors have typically been constructed of nickel or aluminum. Aluminum is generally preferred due to lower cost and lower density. Unfortunately, current collectors constructed from aluminum exhibit a relatively high interfacial impedance associated with the presence of an oxide layer on the surface, which, in turn, results in a loss of energy and reduced power. Such losses are generally attributed to the fact that the aluminum surface includes a native oxide layer which (a) acts as an insulator, increasing interfacial impedance, and thus severely limits electrical conductivity, and (b) greatly hinders adhesion of electrochemically active electrode materials which are to be applied to the surface of the aluminum current collector during electrode fabrication.

Two approaches have been presented to improve aluminum current collector functioning. One approach emphasizes primer layers on the aluminum with improved adhesion, and a second approach emphasizes reduction of interfacial resistance at the aluminum interface. In the first approach polymers containing carboxylic acid functionality have been found to provide strong adhesion to aluminum metal surfaces. For example, in U.S. Pat. No. 5,827,615, Touhsaent et al. show that adhesion of polyvinyl alcohol polymers to aluminum films is improved by the use of carboxylic acid containing polymers in the formulation, such as olefin-maleic acid copolymers. Chassar et al., in U.S. Pat. No. 6,069,221, report that a carboxylic acid function in polymer formulations improves adhesion to metals, particularly aluminum. Similarly, in U.S. Pat. Nos. 5,441,830 and 5,464,707 to Moulton et al., the adhesion-promoting properties of carboxylic acid functionality is described in an electrically conducting primer layer material. In U.S. Pat. Nos. 5,399,447 and 5,520,850, to Chaloner-Gill et al., is described an adhesion promoting layer containing conducting material and a polymer, such as a polyacrylic acid, and a lithium salt to reduce acidity and reactivity to a lithium anode. An example of a conductive primer layer for a current collector from a crosslinked polymer from a crosslinking reaction of a polymer having pendant carboxyl groups, such as ethylene/acrylic acid polymers, with a multifunctional crosslinking agent, is described in U.S. Pat. No. 5,478,676 to Turi et al.

Improved current collector performance by reduction of interfacial resistance has been described, for example, in U.S. Pat. Nos. 5,578,396, 5,591,544, and 5,588,971 to Fauteux et al., by freeing the surface of an aluminum current collector of oxide, etching the surface with a carboxylic acid material to improve adhesion, and providing a primer, such as graphite, to prevent re-growth of the oxide layer. Although carboxylic acid polymers may provide excellent adhesion to aluminum current collectors, problems of corrosion of the aluminum by cell components may still exist.

Another approach to reduce the corrosion of aluminum current collectors is described in U.S. Pat. No. 5,518,839, to Olsen, in which a layer of a corrosion resistant metal, such as nickel, copper, chromium, titanium, or mixtures thereof, is applied to an etched aluminum current collector surface. Such an approach, however, adds an additional process step and adds weight and cost to the cell.

It is thus an object of the present invention to provide a current collector for electrochemical cells and method of manufacturing same, wherein the current collector has a substantially reduced interfacial impedance and substantially increased adhesive capabilities.

SUMMARY OF THE INVENTION

The cathode current collector of the present invention for use in an electrochemical cell comprises: (a) a conductive support, and (b) a conductive primer layer overlying the conductive support, the primer layer comprising from about 25 to 70% by weight of a crosslinked polymeric material formed from a reaction of a polyvinyl acetal and a crosslinking agent, and about 30 to 75% by weight of a conductive filler; and wherein the cell comprises: (i) an anode comprising lithium, and (ii) a cathode comprising an electroactive sulfur-containing material.

The polyvinyl acetal is preferably selected from the group consisting of polyvinyl butyral and polyvinyl formal. In one embodiment, the crosslinking agent comprises phenolic resins. The conductive filler is preferably selected from the group consisting of carbon black, graphites, activated carbon fibers, non-activated carbon nanofibers, metal flakes, metal powders, and electrically conductive polymers. The conductive support is preferably selected from the group consisting of aluminum foil and aluminized plastic films.

In one embodiment, the weight ratio of the polyvinyl acetal to the crosslinking agent in the crosslinked polymeric material is from 4:1 to 2:3. Preferably, the thickness of the conductive primer layer is from about 0.2 to 5 microns.

In one embodiment, the electroactive sulfur-containing material comprises elemental sulfur. In another embodiment, the electroactive sulfur-containing material, in its oxidized state, comprises a polysulfide moiety of the formula, $S_m$, wherein m is an integer equal to or greater than 3. In yet another embodiment, the electroactive sulfur-containing material comprises a sulfur-containing organic polymer.

Another aspect of the present invention pertains to methods of preparing a cathode current collector of an electrochemical cell, wherein the current collector, as described herein, is formed by the steps of: (a) coating onto a conductive support a liquid mixture comprising a polyvinyl acetal, a crosslinking agent, a conductive filler, and a liquid medium; (b) drying and crosslinking the coating formed in step (a) to yield the current collector. The drying and crosslinking step (b) is preferably performed at a temperature of from about 70° C. to about 180° C.

In one embodiment, the liquid medium comprises one or more organic solvents.

DETAILED DESCRIPTION OF THE INVENTION

Figure 1:
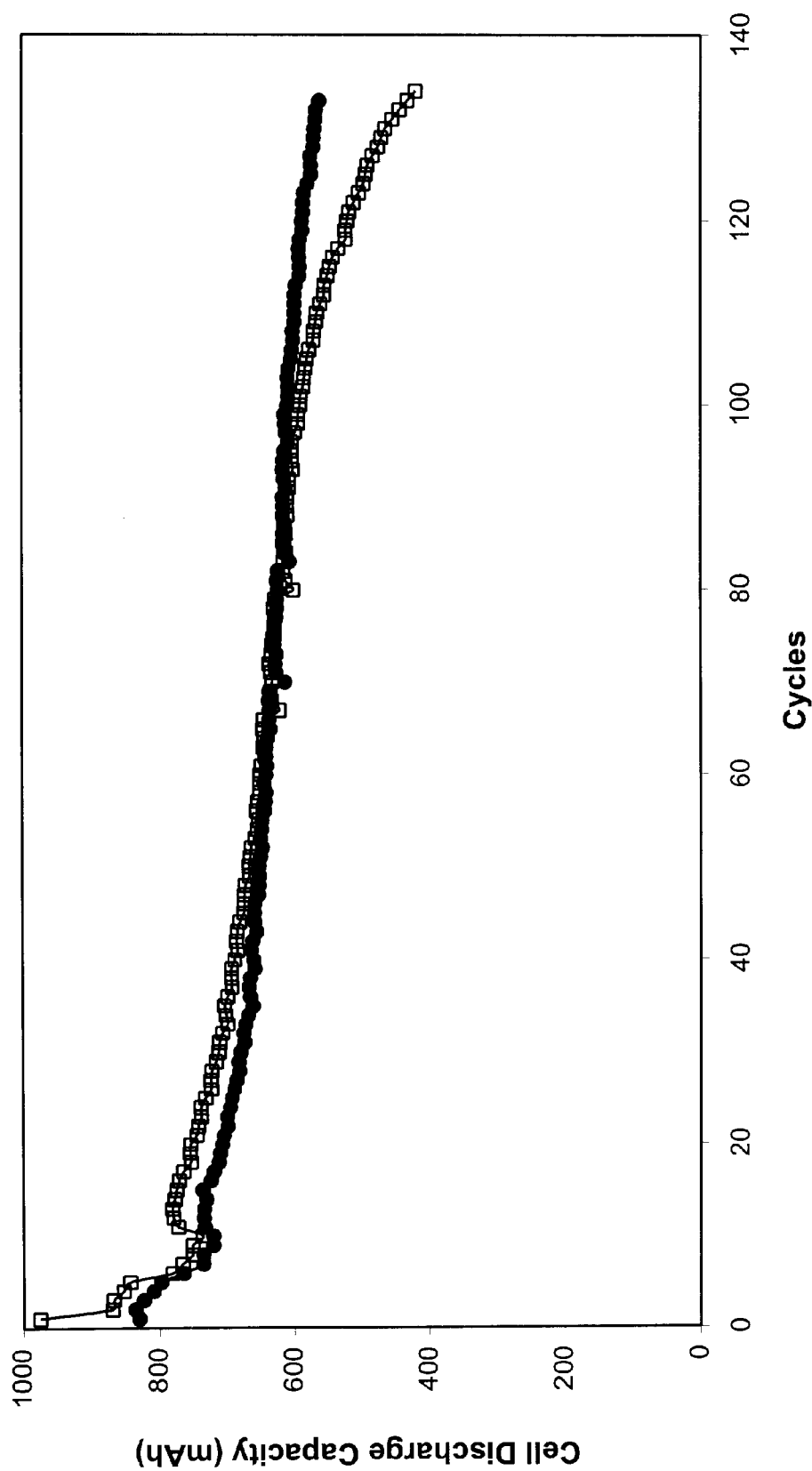
FIG. 1 shows the discharge capacity (mAh/g) vs. cycle number for cells of Example 1 (•) and cells of Comparative Example 1 (□).

One aspect of the present invention pertains to a cathode current collector of an electrochemical cell, wherein the current collector comprises: (a) a conductive support, and (b) a conductive primer layer overlying the conductive support, the primer layer comprising a crosslinked polymeric material formed from a reaction of a polyvinyl acetal and a crosslinking agent, and a conductive filler; and wherein the cell comprises: (i) an anode comprising lithium, and (ii) a cathode comprising an electroactive sulfur-containing material. In particular, the cathode current collectors of the present invention provide improved impedance and increased adhesion of the cathode active layer of the cathode.

Current Collectors

The conductive primer layer of the current collector of the present invention comprises a crosslinked polymeric material formed from a polyvinyl acetal. Preferred polyvinyl acetals are derivatives of polyvinyl alcohol with aldehydes. Any convenient aldehyde such as formaldehyde, acetaldehyde, propionaldehyde, butyraldehyde, isobutyraldehyde, hexanaldehyde, octanaldehyde, isononanaldehyde, hexahydrobenzaldehyde, and benzaldehyde can be used to form the polyvinyl acetal but in practice the most preferred aldehyde is butyraldehyde and so the most preferred acetal is polyvinyl butyral. The polyvinyl acetal typically contains acetal functionality, vinyl alcohol functionality, and vinyl ester functionality, usually as vinyl acetate. The mole % of these functionalities in the polyvinyl acetal may vary over a range from 50 to 90 mole % of vinyl acetal, from 5 to 50 mole % of vinyl alcohol, and from 0 to 15 mole % of vinyl ester. The molecular weight of suitable polyvinyl acetals may also vary over a wide range, for example, from about 30,000 to about 600,000. Preferred polymers are in the molecular weight range of from 40,000 to 200,000, and more preferred polymers are in the molecular weight range of from 50,000 to 120,000.

The polyvinyl acetals may be crosslinked by many different crosslinking agents, as known in the art as being capable of reacting with hydroxyl groups, in forming the polymeric crosslinked materials. Suitable crosslinking agents include, but are not limited to, phenolic resins, epoxides, melamine resins, polyisocyanates, and dialdehydes. Preferred crosslinking agents include melamine resins, for example, condensates of melamine with formaldehyde and lower alcohols, such as methanol, ethanol, butanol, and isobutanol. These melamine resins include those sold under the trademark Resimene® by Solutia Inc., St. Louis, Mo. Other preferred crosslinking agents include phenolic resins, for example, condensates of phenol with formaldehyde and lower alcohols, such as methanol, ethanol, butanol, and isobutanol. These phenolic resins include those sold under the trademark Santolink® by Solutia Inc., St. Louis, Mo. The most preferred crosslinking agents are phenolic resins.

The weight ratio of the polyvinyl acetals to the crosslinking agent in the crosslinked polymeric material may vary over a wide range for reasons including, the hydroxyl content of the polymer, its molecular weight, the reactivity and functionality of the crosslinking agent, the desired rate of crosslinking, and the temperature at which the crosslinking reaction may occur. A preferred weight ratio is from about 4:1 to about 2:3, and a more preferred ratio is from 3:1 to 1:1.

Suitable conductive fillers of the conductive primer layer include, but are not limited to, conductive carbons, such as, carbon black, graphite, graphite fibers, activated carbon fibers, non-activated carbon nanofibers, and carbon fabrics, and metal flakes, metal powders, metal fibers, metal mesh, and electrically conductive polymers. Preferred fillers are conductive carbons such as carbon black and graphite.

A range of ratios of the components of the conductive primer layer can provide the desired adhesion and desired conductivity. In one embodiment, the conductive primer layer comprises from about 25 to about 70% by weight of a crosslinked polymeric material, formed from a reaction of a polyvinyl acetal and a crosslinking agent, and about 30 to about 75% by weight of a conductive filler. In a preferred embodiment, the conductive primer layer comprises from 30 to 60% by weight of the crosslinked polymeric material, and from 40 to 70% by weight of a conductive filler.

In one embodiment of the present invention, the conductive primer layer coated on the conductive support is from 0.2 to 5 microns in thickness. In a preferred embodiment, the conductive primer layer coated on the conductive support is from 0.5 to 3 microns in thickness, and in a more preferred embodiment is from 0.75 to 2 microns.

The conductive support of the current collector upon which the conductive primer layer is coated includes, but is not limited to, those selected from the group consisting of metallized plastic films, metal foils, metal grids, expanded metal grids, metal mesh, metal wool, woven carbon fabric, woven carbon mesh, non-woven carbon mesh, and carbon felt. Preferred conductive supports include aluminum foil and aluminized plastic films, such as aluminized polyester film.

The present invention provides a method of making a current collector for an electrochemical cell, wherein the current collector comprises a conductive support and a conductive primer layer. One aspect of the method of the present invention comprises the steps of: (a) coating onto a conductive support a liquid mixture comprising a polyvinyl acetal, a crosslinking agent, a conductive filler, and a liquid medium; and (b) drying and crosslinking the coating to yield a current collector comprising a conductive primer layer.

Examples of suitable liquid media for the preparation of the conductive primer layers of the current collectors of the present invention include aqueous liquids, non-aqueous liquids, and mixtures thereof. Especially preferred liquids are non-aqueous liquids such as, for example, methanol, ethanol, isopropanol, propanol, butanol, tetrahydrofuran, dimethoxyethane, acetone, methyl ethyl ketone, toluene, xylene, acetonitrile, and cyclohexane.

Mixing of the various components can be accomplished using any of a variety of methods known in the art so long as the desired dissolution or dispersion of the components is obtained. Suitable methods of mixing include, but are not limited to, mechanical agitation, grinding, ultrasonication, ball milling, sand milling, and impingement milling.

The formulated dispersions can be applied to conductive supports by any of a variety of coating methods known in the art and then dried using techniques known in the art. Suitable hand coating techniques include, but are not limited to, the use of a coating rod or gap coating bar. Suitable machine coating methods include, but are not limited to, the use of roller coating, gravure coating, slot extrusion coating, curtain coating, and bead coating. Removal of some or all of the liquid from the mixture can be accomplished by any of a variety of methods known in the art. Examples of suitable methods for the removal of liquid from the mixture include, but are not limited to, hot air convection, heat, infrared radiation, flowing gases, vacuum, reduced pressure, extraction, and by simply air drying. The drying and crosslinking may be performed as a single step or as two steps, for example, the drying step may be performed at a lower temperature followed by a higher temperature crosslinking step. The drying and crosslinking step may be performed at a range of temperatures. Suitable temperatures are those above which the liquid medium becomes volatile, typically above the boiling point, and also above which the crosslinking reaction between the polyvinyl acetal and the crosslinking agent proceeds at an acceptable rate. Suitable temperatures are also below those at which the conductive support, for example, a metallized plastic film, may be damaged. In one embodiment of the present invention, the drying and crosslinking step is performed at a temperature of from about 70° C. to about 180° C. In a preferred embodiment, the drying and crosslinking step is performed at a temperature from 90° C. to 170° C.

The conductive primer layers of the current collectors of the present invention possess excellent adhesion to a conductive support, such as for example, an aluminum foil or an aluminized plastic film. At the same time, the current collectors of the present invention comprising conductive primer layers adhere to cathodes comprising electroactive sulfur-containing materials. The resulting cathode active layer-current collector combinations exhibit low impedance.

Cathode Active Layers

The cathode active layers of the cells of the present invention comprise an electroactive sulfur-containing material. These cathode active layers are coated onto substrates such as the current collectors of the present invention, to form composite cathodes. The term "electroactive sulfur-containing material," as used herein, relates to cathode active materials which comprise the element sulfur in any form, wherein the electrochemical activity involves the breaking or forming of sulfur-sulfur covalent bonds. Examples of suitable electroactive sulfur-containing materials include, but are not limited to, elemental sulfur and organic materials comprising both sulfur atoms and carbon atoms, which may or may not be polymeric. Suitable organic materials include those further comprising heteroatoms, conductive polymer segments, composites, and conductive polymers.

In one preferred embodiment, the electroactive sulfur-containing material comprises elemental sulfur. In one preferred embodiment, the electroactive sulfur-containing material comprises a mixture of elemental sulfur and a sulfur-containing organic polymer.

In another embodiment, the sulfur-containing material, in its oxidized state, comprises a polysulfide moiety, $S_m$, selected from the group consisting of covalent $—S_m—$ moieties, ionic $—S_m^-$ moieties, and ionic $S_m^{2-}$ moieties, wherein m is an integer equal to or greater than 3, such as, for example, elemental sulfur and sulfur-containing polymers. Examples of sulfur-containing polymer include, but are not limited to, those described in U.S. Pat. Nos. 5,601, 947; 5,690,702; and 5,529,860 to Skotheim et al.; U.S. patent application Ser. No. 08/995,122 to Gorkovenko et al.; Ser. No. 09/033,218 to Skotheim et al.; Ser. No. 09/565,187 to Movchan et al.; and Ser. No. 09/565,184 to Kovalev et al., all of the common assignee, and incorporated herein by reference in their entirety. Other suitable electroactive sulfur-containing materials comprising polysulfide linkages include, but are not limited to, those described in U.S. Pat. No. 4,664,991 to Perichaud et al., and in U.S. Pat. Nos. 5,723,230; 5,783,330; 5,792,575; and 5,882,819 to Naoi et al.

In one embodiment, m of the polysulfide moiety, $S_m$, of the sulfur-containing polymer is an integer equal to or greater than 6. In one embodiment, m of the polysulfide moiety, $S_m$, of the sulfur-containing polymer is an integer equal to or greater than 8. In one embodiment, the sulfur-containing polymer has a polymer backbone chain and the polysulfide moiety, $S_m$, is covalently bonded by one or both of its terminal sulfur atoms on a side group to the polymer backbone chain. In one embodiment, the sulfur-containing polymer has a polymer backbone chain and the polysulfide moiety, $S_m$, is incorporated into the polymer backbone chain by covalent bonding of the terminal sulfur atoms of the polysulfide moiety.

Still further examples of electroactive sulfur-containing materials include those comprising disulfide groups as described, for example, in U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

Preferably, the electroactive sulfur-containing material comprises greater than 50% by weight of sulfur. More preferably, the electroactive sulfur-containing material comprises greater than 75% by weight of sulfur, and most preferably, the electroactive sulfur-containing material comprises greater than 90% by weight of sulfur.

The electroactive sulfur-containing cathodes may further comprise electroactive metal chalcogenides, electroactive conductive polymers, and combinations thereof.

The cathode active layers may further comprise one or more conductive fillers to provide enhanced electronic conductivity. Examples of conductive fillers include, but are not limited to, those selected from the group consisting of conductive carbons, graphites, activated carbon fibers, non-activated carbon nanofibers, metal flakes, metal powders, metal fibers, and electrically conductive polymers. The amount of conductive filler, if present, is preferably in the range of 2 to 30% by weight.

The cathode active layers may also comprise a binder. The choice of binder material may vary widely so long as it is inert with respect to the other materials in the cathode. Useful binders are those materials, usually polymeric, that allow for ease of processing of battery electrode composites and are generally known to those skilled in the art of electrode fabrication. Examples of useful binders include, but are not limited to, those selected from the group consisting of polytetrafluoroethylenes (Teflon®), polyvinylidene fluorides (PVF$_2$ or PVDF), ethylene-propylene-diene (EPDM) rubbers, polyethylene oxides (PEO), UV curable acrylates, UV curable methacrylates, and heat curable divinyl ethers, and the like. Other suitable binders include crosslinked polymers, such as those made from polymers having carboxyl groups and crosslinking agents. The amount of binder, if present, is preferably in the range of 2 to 30% by weight.

The cathodes may be prepared by methods known in the art. For example, one suitable method comprises the steps of: (a) dispersing or suspending in a liquid medium the electroactive sulfur-containing material, as described herein; (b) optionally adding to the mixture of step (a) a conductive filler and/or binder; (c) mixing the composition resulting from step (b) to disperse the electroactive sulfur-containing material; (d) casting the composition resulting from step (c) onto a suitable substrate; and (e) removing some or all of the liquid from the composition resulting from step (d) to provide the cathode active layer.

Examples of suitable liquid media for the preparation of the cathode active layers include aqueous liquids, non-aqueous liquids, and mixtures thereof Especially preferred liquids are non-aqueous liquids such as, for example, methanol, ethanol, isopropanol, propanol, butanol, tetrahydrofuran, dimethoxyethane, acetone, toluene, xylene, acetonitrile, and cyclohexane.

Mixing of the various components can be accomplished using any of a variety of methods known in the art so long as the desired dissolution or dispersion of the components is obtained. Suitable methods of mixing include, but are not limited to, mechanical agitation, grinding, ultrasonication, ball milling, sand milling, and impingement milling.

The formulated dispersions can be applied to the current collectors of the present invention by any of a variety of coating methods known in the art and then dried using techniques known in the art. Suitable hand coating techniques include, but are not limited to, the use of a coating rod or gap coating bar. Suitable machine coating methods include, but are not limited to, the use of roller coating, gravure coating, slot extrusion coating, curtain coating, and bead coating. Removal of some or all of the liquid from the mixture can be accomplished by any of a variety of methods known in the art. Examples of suitable methods for the removal of liquid from the mixture include, but are not limited to, hot air convection, heat, infrared radiation, flowing gases, vacuum, reduced pressure, extraction, and by simply air drying.

The method of preparing the cathodes may further comprise heating the electroactive sulfur-containing material to a temperature above its melting point and then resolidifying the melted electroactive sulfur-containing material to form a cathode active layer having redistributed sulfur-containing material of higher volumetric density than before the melting process, for example, as described in PCT Publication No. WO 00/36674 to Xu et al. of the common assignee.

Cathode active layers coated onto the current collectors of the present invention as a substrate were found to possess good adhesion between the electroactive sulfur-containing material and other materials of the cathode active layer and the conductive primer layer as shown by the long cycle life of the cells of Example 2 and Example 3. The cells of Example 2 provide a much lower interfacial impedance vs. those of Comparative Example 3.

While these are preferred cathode active materials, the current collectors may also be used with other cell chemistries.

Anodes

Suitable anode active materials, comprising lithium, for the anodes of the present invention include, but are not limited to, lithium metal, such as lithium foil and lithium deposited onto a substrate, such as a plastic film, and lithium alloys, such as lithium-aluminum alloys and lithium-tin alloys. While these are preferred anode active materials, the current collectors may also be used with other cell chemistries.

Electrolytes

The electrolytes used in electrochemical cells function as a medium for the storage and transport of ions, and in the special case of solid electrolytes and gel electrolytes, these materials may additionally function as separator materials between the anode and the cathode. Any liquid, solid, or gel material capable of storing and transporting ions may be used, so long as the material is electrochemically and chemically unreactive with respect to the anode and the cathode, and the material facilitates the transport of lithium ions between the anode and the cathode. The electrolyte must also be electronically non-conductive to prevent short circuiting between the anode and the cathode.

Typically, the electrolyte comprises one or more ionic electrolyte salts to provide ionic conductivity and one or more non-aqueous liquid electrolyte solvents, gel polymer materials, or solid polymer materials. Suitable non-aqueous electrolytes for use in the present invention include, but are not limited to, organic electrolytes comprising one or more materials selected from the group consisting of liquid electrolytes, gel polymer electrolytes, and solid polymer electrolytes, as are known in the art. Examples of non-aqueous electrolytes for lithium batteries are described by Dominey in *Lithium Batteries, New Materials, Developments and Perspectives*, Chapter 4, pp. 13714 165, Elsevier, Amsterdam (1994). Examples of gel polymer electrolytes and solid polymer electrolytes are described by Alamgir et al. in *Lithium Batteries, New Materials, Developments and Perspectives*, Chapter 3, pp. 93–136, Elsevier, Amsterdam (1994).

Examples of useful liquid electrolyte solvents include, but are not limited to, non-aqueous organic solvents, such as, for example, N-methyl acetamide, acetonitrile, acetals, ketals, esters, carbonates, sulfones, sulfolanes, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are also useful as liquid electrolyte solvents.

These liquid electrolyte solvents are themselves useful as plasticizers for gel polymer electrolytes. Examples of useful gel polymer electrolyte materials include, but are not limited to, those comprising polymers selected from the group consisting of polyethylene oxides, polypropylene oxides, polyacrylonitriles, polysiloxanes, polyimides, polyphosphazenes, polyethers, sulfonated polyimides, perfluorinated membranes (such as, for example, NAFION™ resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing.

Examples of useful solid polymer electrolyte materials include, but are not limited to, those comprising polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing. These solid polymer electrolyte materials may contain a liquid electrolyte solvent, typically at a level of less than 20% by volume of the total electrolyte.

Ionic electrolyte salts are added to the electrolyte to increase the ionic conductivity. Examples of ionic electrolyte salts for use in the present invention include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$. Other electrolyte salts useful in the practice of this invention include lithium polysulfides (Li$_2$S$_x$), and lithium salts of organic ionic polysulfides (LiS$_x$R)$_z$, where x is an integer from 1 to 20, z is an integer from 1 to 3, and R is an organic group, and those disclosed in U.S. Pat. No. 5,538,812 to Lee et al. Preferred ionic electrolyte salts are LiBr, LiI, LiSCN, LiBF$_4$, LiPF$_6$, LiAsF$_6$, LiSO$_3$CF$_3$, LiN(SO$_2$CF$_3$)$_2$, and LiC(SO$_2$CF$_3$)$_3$.

Separators

The electrochemical cells of the present invention may further comprise a separator interposed between the cathode and anode. Typically, the separator is a solid non-conductive or insulative material which separates or insulates the anode and the cathode from each other and which permits the transport of ions between the anode and the cathode.

The pores of the separator may be partially or substantially filled with electrolyte. Separators may be supplied as porous free standing films which are interleaved with the anodes and the cathodes in the fabrication of electrochemical cells. Alternatively, the porous separator layer may be applied directly to the surface of one of the electrodes, for example, as described in U.S. patent application Ser. No. 08/995,089 to Carlson et al. of the common assignee and in U.S. Pat. No. 5,194,341 to Bagley et al.

A variety of separator materials are known in the art. Examples of suitable solid porous separator materials include, but are not limited to, polyolefins, such as, for example, polyethylenes and polypropylenes, glass fiber filter papers, and ceramic materials. Further examples of separators and separator materials suitable for use in this invention are those comprising a microporous pseudo-boehmite layer, which may be provided either as a free standing film or by a direct coating application on one of the electrodes, as described in PCT Publication No. WO 99/33125, by Carlson et al. of the common assignee. Solid polymer electrolytes and gel polymer electrolytes may also function as a separator in addition to their electrolyte function.

In one embodiment, the solid porous separator is a porous polyolefin separator. In one embodiment, the solid porous separator comprises a microporous xerogel layer, such as, for example, a microporous pseudo-boehmite layer.

Cells and Batteries

Cells or batteries of the present invention comprising current collectors, as described herein, may be made in a variety of sizes and configurations which are known to those skilled in the art. These battery design configurations include, but are not limited to, planar, prismatic, jelly roll, w-fold, stacked and the like. Although the methods of the present invention are particularly suitable for use with thin film electrodes, they may nevertheless be beneficial in thick film designs. Alternatively, designs incorporating both low and high surface area regions, as described in U.S. Pat. Nos. 5,935,724 and 5,935,728 to Spillman et al., can be incorporated into jellyroll and other configurations.

Thin film electrodes, in particular, may be configured into prismatic designs. With the drive to conserve weight, thin film barrier materials are particularly preferred, e.g., foils. For example, PCT Publication No. WO 99/30133 to Thibault et al. of the common assignee describes methods for preparing prismatic cells in which suitable barrier materials for sealed casings, methods of filling cells with electrolyte, and methods of sealing the casing, are described.

EXAMPLES

Several embodiments of the present invention are described in the following examples, which are offered by way of illustration and not by way of limitation.

Example 1

A cathode current collector was fabricated by coating a conductive primer layer on both sides of aluminum foil. A primer slurry containing 22% of solids in ethanol/methyl ethyl ketone (55:45 by weight) was prepared by dispersing Butvar B-76 (a trade name for a polyvinyl butyral, available from Solutia Inc., St. Louis, Mo.), 30 parts by weight; Santolink EP560 (a trade name for a phenolic resin crosslinker available from Solutia Inc., St. Louis, Mo.), 20 parts by weight; and Vulcan XC72R (a trade name for a conductive carbon available from Cabot Corporation, Tuscola, Ill.), 50 parts by weight. The slurry was coated by a slot die coater onto both sides of a 12 micron thick aluminum foil (available from All-Foils Inc., Brooklyn Heights, Ohio), at a web speed of 20 feet/minute. The coating was dried in the ovens (infrared drying) on the slot die coater at a temperature estimated to reach 140° C. An additional heat treatment in a Shanklin machine set at 177° C. for 1 minute, giving a web temperature of about 160° C., completed the drying and crosslinking step. The resulting dry conductive primer layer had a thickness of about 2 microns on each side of the aluminum foil. The coated foil was used as a cathode current collector.

Example 2

A cathode current collector was fabricated by coating a conductive primer layer on both sides of aluminum foil. A primer slurry containing 22% of solids in ethanol/methyl ethyl ketone (55:45 by weight) was prepared by dispersing Butvar B-76, 30 parts by weight; Santolink EP560, 30 parts by weight; and Vulcan XC72R, 40 parts by weight. The slurry was coated by a slot die coater onto both sides of a 12 micron thick aluminum foil and then dried and crosslinked by the method of Example 1.

Comparative Example 1

A 18 micron thick conductive carbon coated aluminum foil commercially available from Rexam Graphics, South Hadley, Mass. (Product No. 60303), in which the conductive primer comprises a crosslinked polymer layer, was used as a current collector.

Comparative Example 2

A conductive primer layer comprising a crosslinked polymer material having pendant carboxylic acid groups crosslinked with a multifunctional crosslinking agent, similar to that described in U.S. Pat. No. 5,478,676, was coated on an aluminum foil for use as a current collector.

A primer slurry having a solids content of 15% was prepared in a solvent mixture of isopropanol/water/2-methoxy-1-propanol/dimethylethanolamine (90:8:1:1 by weight) by dispersing 47 parts by weight of TA22-8 resin (a trade name for an acrylate-acrylic acid copolymer available from Dock Resins Corporation, Linden, N.J.), 6 parts by weight of Ionac PFAZ-322 (a trade name for a polyfunctional aziridine crosslinking agent available from Sybron Chemicals Inc., Birmingham, N.J.), and 47 parts by weight of Vulcan XC72R. The slurry was coated on both sides of a 12 micron thick aluminum foil as described in Example 1.

Example 3

A cathode slurry was prepared from 65 parts by weight of elemental sulfur (available from Aldrich Chemical Company, Milwaukee, Wis.), 15 parts by weight of Printex XE-2 (a trade name for conductive carbon available from Degussa Corporation, Akron, Ohio), 15 parts by weight of graphite (available from Fluka/Sigma-Aldrich, Milwaukee, Wis.), and 5 parts by weight of CAB-O-SIL TS 530 (a trade name for fumed silica available from Cabot Corporation, Tuscola, Ill.). The solids content of the slurry was 13% by weight in isopropanol. The slurry was coated by a slot die coater onto both sides of the current collector of Example 1. The coating was dried in the ovens on the slot die coater. The resulting dry cathode active layer had a thickness of about 20 microns on each side of the current collector, with a loading of electroactive cathode material of about 1.1 mg/cm$^2$.

Figure 2:
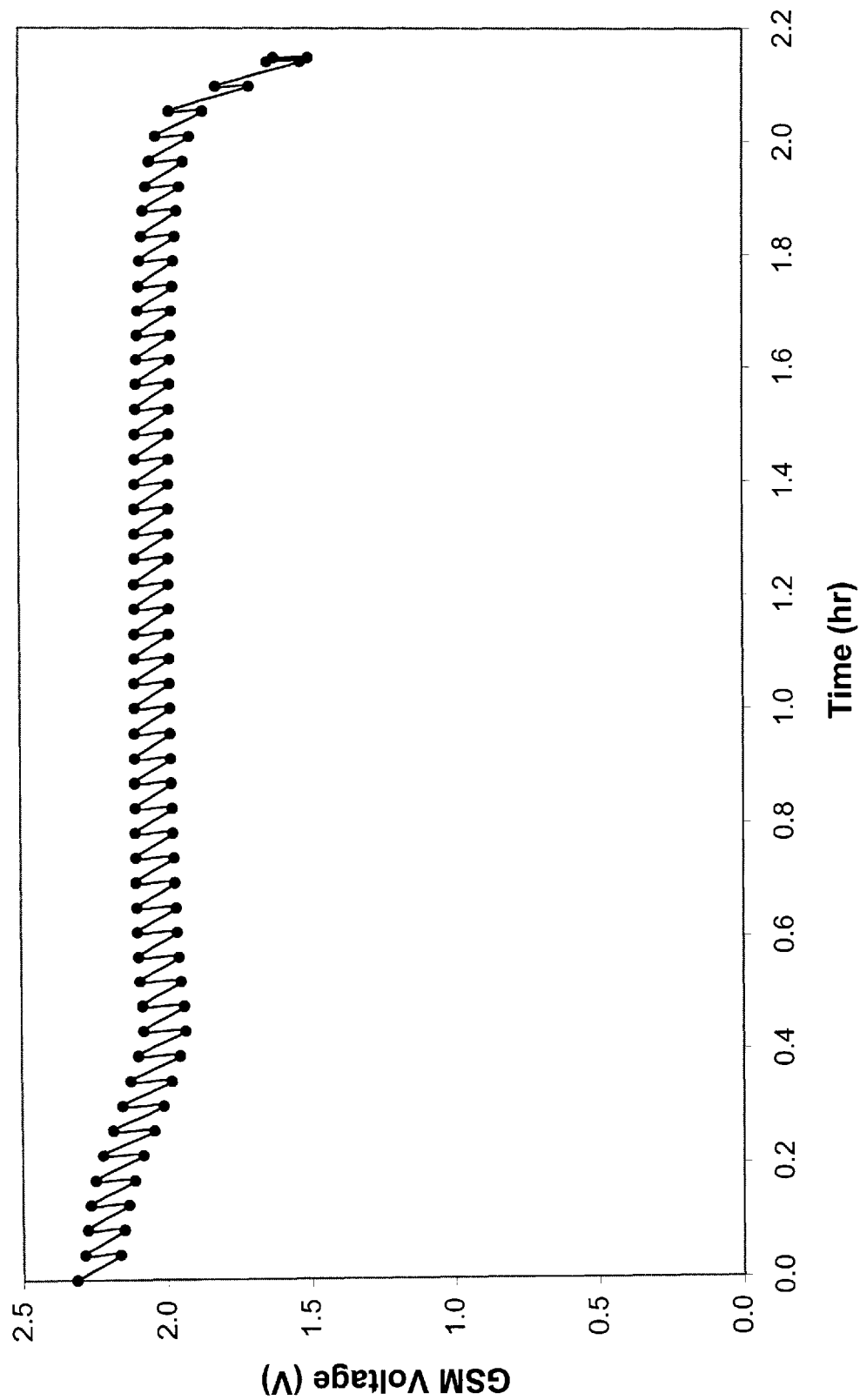
FIG. 2a shows the GSM voltage vs. time for the cells of Example 1 (•)
FIG. 2b shows the GSM voltage vs. time for the cells of Comparative Example 1 (□).
Figure 2:
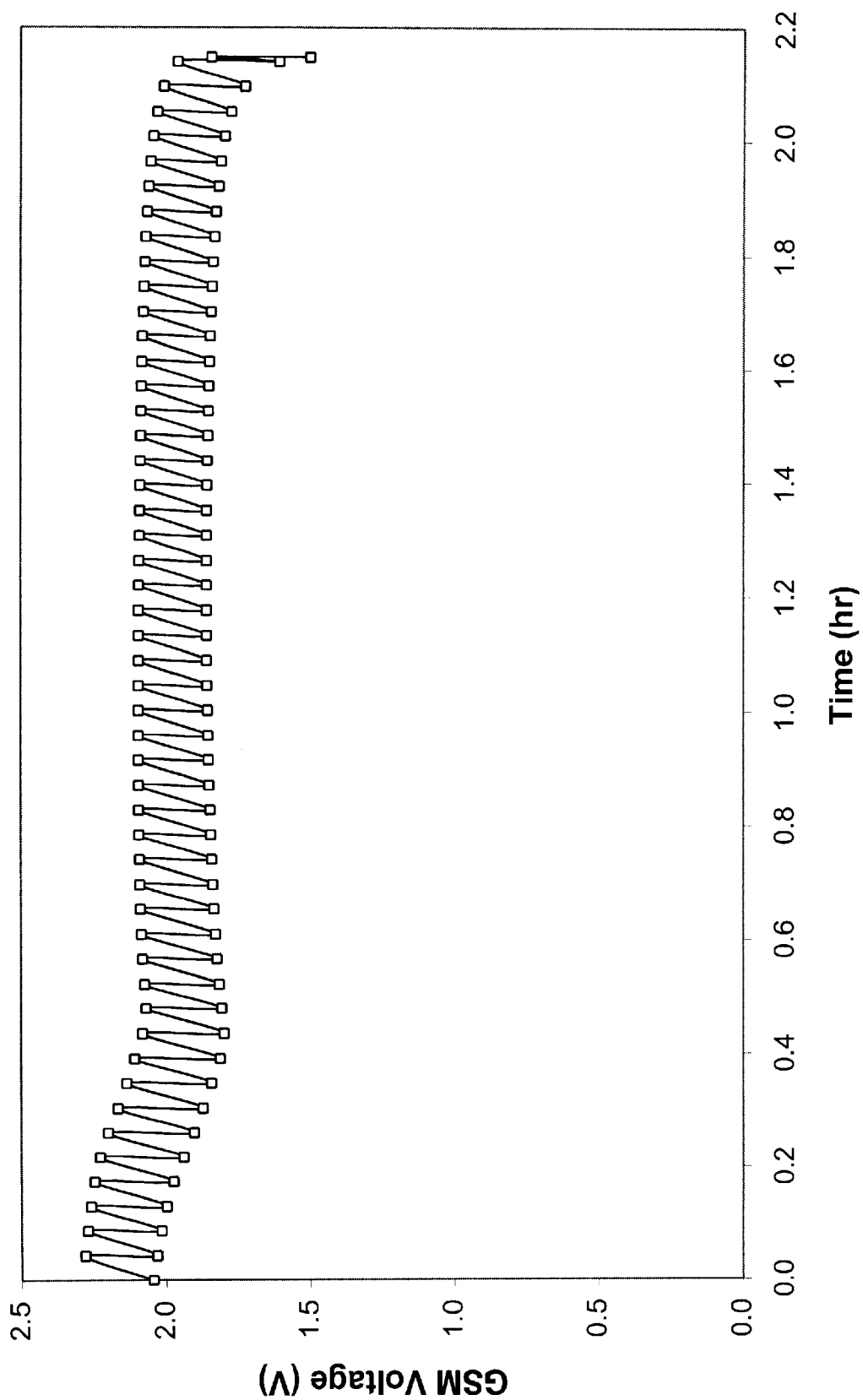

Prismatic cells were fabricated using the coated cathode. The anode was lithium foil of about 50 microns in thickness. The electrolyte was a 1.4 M solution of lithium bis(trifluoromethylsulfonyl)imide, (lithium imide, available from 3M Corporation, St. Paul, Minn.) in a 41.5:58.5 volume ratio mixture of 1,3-dioxolane and 1,2-dimethoxyethane. The porous separator used was 16 micron E25 SETELA (a trademark for a polyolefin separator available from Mobil Chemical Company, Films Division, Pittsford, N.Y.). The above components were combined into a layered structure of cathode/separator/anode, which was wound and compressed, with the liquid electrolyte filling the void areas of the separator and cathode to form prismatic cells with an electrode area of about 840 cm$^2$. Discharge-charge cycling of these cells was done at 0.42/0.24 mA/cm$^2$, respectively, with discharge cutoff at a voltage of 1.5V and charge cutoff at 2.8V with 110% overcharge. A GSM test was applied at the 6$^{th}$–10$^{th}$ cycles, with 2.0A and 0.15A pulses. Discharge capacity at the 5$^{th}$ cycle was 800 mAh and at the 130$^{th}$ cycle was 570 mAh, as shown in FIG. 1. The GSM polarization of the cells at the 8$^{th}$ cycle was 120 mV as shown in FIG. 2a.

Example 4

A cathode slurry was prepared from 70 parts by weight of elemental sulfur, 15 parts by weight of Printex XE-2, 10 parts by weight of graphite, 4 parts by weight of TA22-8 resin and 1 part by weight of Ionac PFAZ-322. The solid content of the slurry was 14% by weight in a solvent mixture of 80% isopropanol, 12% water, 15% 1-methoxy-2-propanol and 3% dimethyl ethanolamine (by weight). The slurry was coated by a slot die coater onto both sides of the current collector of Example 1. The coating was dried in the ovens on the slot die coater. The resulting dry cathode active layer had a thickness of about 20 microns on each side of the current collector, with a loading of electroactive cathode material of about 1.1 mg/cm$^2$.

Prismatic cells were fabricated using this coated cathode by the method of Example 3. Discharge-charge cycling of these cells was performed by the method of Example 3. Discharge capacity at the 5$^{th}$ cycle was 850 mAh and at the 120$^{th}$ cycle was 615 mAh.

Example 5

The cathode formulation described in Example 3 was coated on both sides of the primer-coated current collector of Example 2. The method of Example 3 was used in cell fabrication and to prepare prismatic cells. Discharge-charge cycling of these cells was performed by the method of Example 3. Discharge capacity at the 5$^{th}$ cycle was 805 mAh and at the 68$^{th}$ cycle was 648 mAh.

Comparative Example 3

The cathode formulation of Example 3 was coated on the current collector of Comparative Example 1. Fabrication and cell construction followed the method of Example 3. The loading of electroactive cathode material was 1.15 mg/cm$^2$. Discharge-charge cycling of these cells was performed by the method of Example 3. Discharge capacity at the 5$^{th}$ cycle was 840 mAh and at the 130$^{th}$ cycle was 450 mAh, as shown in FIG. 1. The GSM polarization of the cells at the 8$^{th}$ cycle was 240 mV as shown in FIG. 2b.

Comparative Example 4

The cathode formulation of Example 3 was coated on the current collector of Comparative Example 2. Fabrication, cell construction and cell test followed the method of Example 3. The loading of electroactive cathode material was 1.15 mg/cm$^2$. The discharge capacity at the 5$^{th}$ cycle was 430 mAh and at the 60$^{th}$ cycle was 230 mAh.

While the invention has been described in detail and with reference to specific embodiments thereof, it will be apparent to one skilled in the art that various changes and modifications can be made without departing from the spirit and scope thereof.

What is claimed:

1. A cathode current collector of an electrochemical cell, wherein said current collector comprises:
   (a) a conductive support; and
   (b) a conductive primer layer overlying said conductive support, said primer layer comprising from 25 to 70% by weight of a crosslinked polymeric material formed from a reaction of a polyvinyl acetal and a crosslinking agent, and 30 to 75% by weight of a conductive filler; and wherein said cell comprises:
   (i) an anode comprising lithium; and
   (ii) a cathode comprising an electroactive sulfur-containing material.

2. The current collector of claim 1, wherein said polyvinyl acetal is selected from the group consisting of polyvinyl butyral and polyvinyl formal.

3. The current collector of claim 1, wherein said crosslinking agent comprises a phenolic resin.

4. The current collector of claim 1, wherein said conductive filler is selected from the group consisting of carbon black, graphites, activated carbon fibers, non-activated carbon nanofibers, metal flakes, metal powders, and electrically conductive polymers.

5. The current collector of claim 1, wherein said conductive support is selected from the group consisting of aluminum foil and aluminized plastic films.

6. The current collector of claim 1, wherein the thickness of said conductive primer layer is from 0.2 to 5 microns.

7. The current collector of claim 1, wherein the thickness of said conductive primer layer is from 0.5 to 3 microns.

8. The current collector of claim 1, wherein said conductive primer layer comprises from 30 to 60% by weight of said crosslinked polymeric material.

9. The current collector of claim 1, wherein said conductive primer layer comprises from 40 to 70% by weight of said conductive filler.

10. The current collector of claim 1, wherein the weight ratio of said polyvinyl acetal to said crosslinking agent in said crosslinked polymeric material is from 4:1 to 2:3.

11. A method of making a cathode current collector of an electrochemical cell, said current collector comprising a conductive support and a conductive primer layer, wherein said method comprises the steps of:

(a) coating onto a conductive support a liquid mixture comprising a polyvinyl acetal, a crosslinking agent, a conductive filler, and a liquid medium; and (b) drying and crosslinking the coating formed in step (a) to yield said current collector;

wherein said electrochemical cell comprises:
(i) an anode comprising lithium; and
(ii) a cathode comprising an electroactive sulfur-containing material.

12. The method of claim 11, wherein said conductive primer layer comprises from 25 to 70% by weight of a crosslinked polymeric material formed from a reaction of a polyvinyl acetal and a crosslinking agent, and 30 to 75% by weight of a conductive filler.

13. The method of claim 12, wherein the weight ratio of said polyvinyl acetal to said crosslinking agent in said crosslinked polymeric material is from 4:1 to 2:3.

14. The method of claim 11, wherein said polyvinyl acetal is selected from the group consisting of polyvinyl butyral and polyvinyl formal.

15. The method of claim 11, wherein said crosslinking agent comprises a phenolic resin.

16. The method of claim 11, wherein said conductive filler is selected from the group consisting of carbon black, graphites, activated carbon fibers, non-activated carbon nanofibers, metal flakes, metal powders, and electrically conductive polymers.

17. The method of claim 11, wherein said conductive support is selected from the group consisting of aluminum foil and aluminized plastic film.

18. The method of claim 11, wherein said liquid medium comprises one or more organic solvents.

19. The method of claim 11, wherein said drying and crosslinking step (b) is performed at a temperature of from 70° C. to 180° C.

20. The method of claim 11, wherein said drying and crosslinking step (b) is performed at a temperature of from 90° C. to 170° C.

* * * * *